United States Patent Office 3,531,452
Patented Sept. 29, 1970

3,531,452
TEMPERATURE-RESISTANT ARTICLES
Russell K. Griffith, Chagrin Falls, and Roman Zorska, Cleveland, Ohio, assignors to The Standard Oil Company, Cleveland, Ohio, a corporation of Ohio
No Drawing. Filed Oct. 11, 1967, Ser. No. 674,632
Int. Cl. C08f *3/76, 15/22, 15/28*
U.S. Cl. 260—88.7                                 5 Claims

ABSTRACT OF THE DISCLOSURE

Temperature resistant, flame resistant molded articles are prepared from oriented acrylonitrile polymers by molding at elevated temperature and pressure and heat treating at a temperature of from about 140 to 250° C.

---

This invention relates to high-softening, flame-resistant molded articles which result from heat treatment of molded, oriented acrylonitrile polymers.

Olefinic nitrile polymers such as polyacrylonitrile have many excellent physical and chemical properties which are highly desirable in shaped articles; however, shaped articles from these polymers have had to be formed by other than conventional means heretofore. The unreinforced articles previously prepared from polyacrylonitrile have been quite brittle and possess relatively poor physical properties. The well known failure of many acrylonitrile polymers to respond to conventional thermoforming techniques is decidedly disadvantageous and could very well be the primary reason why shaped articles based on acrylonitrile polymers, other than fibers which are usually spun from solutions of the polymer, are not widely available for use in commerce.

One novel, commercially practical method for the production of acrylonitrile polymer shaped articles is disclosed and claimed in U.S. Pat. 3,412,177. Another commercially practical method is disclosed in the copending U.S. patent application of Russell K. Griffith, Ser. No. 583,958, filed Oct. 3, 1966. The present invention is concerned with the controlled heat treatment of acrylonitrile polymer articles of the types described in the above-mentioned copending U.S. patent applications and is particularly applicable to the material described and claimed in copending U.S. patent application Ser. No. 583,958.

Acrylonitrile polymers, and polyacrylonitrile in particular, have been available for many years. No known, commercially feasible molding process for polyacrylonitrile articles of good physical properties was known prior to the processes described in the aforementioned copending U.S. patent applications. The present invention provides a controlled heat-treating means for improving the physical and chemical properties of articles of the type described in the copending U.S. patent applications.

The heat treatment of polyacrylonitrile has been previously described. The prior art heat treatment of polyacrylonitrile has generally been confined to the very high temperature heat treatment of polyacrylonitrile fibers to produce products which are composed of carbon, little or no hydrogen, and sometimes nitrogen. For instance, Belgian Pat. No. 690,072 describes carbon fibers of very high strength prepared from polyacrylonitrile fibers by heating at 1000° C. in an inert atmosphere. Japanese Pat. No. 4,405/62 describes the heat treatment of polyacrylonitrile fibers at 800° C. In the Journal of the American Chemical Society, 87, 2071 (1965), the treatment of polyacrylonitrile at 450° C. to form a dehydrogenation catalyst is described. The heat treatment of "Orlon" acrylic fibers is described in Journal of Textile Research, vol. 20, 786 (1950).

We have discovered that the physical properties of polyacrylonitrile articles prepared by molding at elevated temperature and pressure an oriented acrylonitrile polymer can be improved markedly by heat treating said articles at a temperature above 130° C. and no higher than 250° C. and preferably in the temperature range of from 140–235° C. The articles embodied in our invention are prepared by the specified heat treatment for some finite time interval. At the lower temperatures, i.e., 140° C., it is necessary to heat treat for at least about two hours. At sufficient higher temperatures, heat treating can be done in a matter of a few minutes or less. The thus heat treated polyacrylonitrile articles of our invention show marked improvement over the parent articles, particularly in flame resistance and heat distortion temperature. The heat treated polyacrylonitrile articles of this invention can be characterized as being flame resistant, i.e., self-extinguishing, and as having a broad X-ray diffraction band at 16° (5.3 A.), ASTM No. D648–264 p.s.i. heat distortion temperatures above 100° C., specific gravity above 1.18, hydrogen analysis between 1.96% and 5.70%, no 10.75 cm.$^{-1}$ infrared band and are brown in color. Molded articles of acrylonitrile polymers heat treated by our process are very hard, often exhibiting hardness on the Rockwell M scale of up to 128. In a less preferred embodiment of our invention the oriented or sheared polymer of acrylonitrile can be heat treated at a temperature in the range of 140 to 235° C. and then molded as herein disclosed to an article having superior hardness, softening point and flame resistance.

The heat treatment process of our invention can be conducted in air, in vacuuo or in the presence of an inert gas such as nitrogen, helium, etc.

The polyacrylonitrile articles useful in the heat treatment process of this invention can be of any desired shape and size. Particularly useful in the present invention are polyacrylonitrile articles molded from oriented films or the "sheared" polyacrylonitrile described more fully in copending U.S. patent application Ser. No. 583,958. It is within the scope of this invention first to heat treat the oriented films or shaped polymers themselves because the molded articles of our invention can also be prepared by molding these heat treated, oriented materials.

Sheared polyacrylonitrile can be prepared in a number of ways such as by passing polyacrylonitrile powder through the rolls of a differential speed roll rubber mill in which the rolls are heated in the range of from about 150–500° F. to produce a translucent sheet of polymer. This sheet is then broken up into a fluffy powder by cutting it into chunks which in turn are added to a high speed shearing device such as a Waring Blendor. The resulting fluffy powder can then be compression molded into solid, clear articles such as dishes, cups, gears, wheels and the like, which then can be heat treated according to the process of this invention to give improved solvent resistance, flame resistance, heardness and heat distortion temperature.

The term "shear" as used herein is to be taken to mean "simple shear" as it is normally defined. (See "The Physics of Rubber Elasticity," L.R.G. Treloar, Oxford, 1958, page 88.) That is, the sliding of planes of the polymer parallel to a given plane by an amount proportional to their distance from the given plane. Shearing is a constant volume process in which two dimensions of a unit cube of material remain constant during the deformation. This is to be contrasted with the fiber drawing process in which all dimensions of a unit cube are changed. In shear the applied force acting in the $x$ direction gives rise to a plane displacement, $u_x$, at a distance, $y$, from the reference plane and leads to a gradient $\partial u_x / \partial y$ perpendicular to the applied force and to the reference plane. An additional gradient $\partial u_y/\partial y$ is formed perpendicular to the plane defined by equal values of $u_x$. There are therefore two gradients acting at right angles to the plane undergoing a shear deformation. The technique of drawing, however, leads to a radially oriented gradient as well as one acting parallel to the applied force. The resulting displacements in drawing are not planar and do not lead to the same crystallinity on three dimensional order that one finds in sheared polyacrylonitrile.

For the purposes of this invention the preferred olefinic nitriles are those having the structure

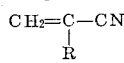

wherein R is hydrogen, a lower alkyl group or a halogen. More preferred are acrylonitrile and methacrylonitrile and the most highly preferred olefinic nitrile is acrylonitrile.

The acrylonitrile polymers useful in the present invention are those composed of a major amount of acrylonitrile. Preferred are acrylonitrile homopolymers and copolymers prepared from monomer mixtures of at least 70% by weight of acrylonitrile and up to 30% by weight of at least one other monomer copolymerizable with acrylonitrile. More preferred are polymers prepared from a mixture of at least 90% by weight of acrylonitrile. The other monomer copolymerizable with acrylonitrile can be either a monoalkenyl or a polyalkenyl monomer. The most preferred acrylonitrile polymer in the present invention is acrylonitrile homopolymer.

Useful monoalkenyl monomers include acrylic acid and the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; methacrylic acid and methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate and the like; vinyl ethers such as ethyl vinyl ether, octyl vinyl ether, phenyl vinyl ether and the like; the vinyl aromatics such as styrene, alpha-methyl styrene, vinyl toluene, the vinyl xylenes, the vinyl naphthalenes, isopropenyl benzene and the like; maleic acid, fumaric acid, itaconic acid, maleic anhydride and esters such as dimethyl maleate, dimethyl fumarate, diethyl maleate, diethyl itaconate and the like; vinyl amides such as acrylamide, methacrylamide, N-methyl acrylamide, N-methylol acrylamide, vinyl benzamide, N-vinyl pyrrolidone and the like; the vinyl halides such as vinyl chloride, vinyl bromide, vinyl fluoride, vinylidene fluoride, dichloro difluoro ethylene, tetrafluoroethylene and the like; olefins such as ethylene, propylene, butene-1 and the like; vinyl amines such as the vinyl pyridines, allyl amine, methallyl amines and others.

Useful polyalkenyl monomers include those having at least two vinyl groups per molecule such as allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1 - trimethoxypropanedimethacrylate, glyceryl triacrylate, sucrose hexacrylate, diallyl phthalate, triallyl cyanurate, 2,2,5,5-tetramethyl-1,5-hexadiene, 1,5 - hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl acrylamide, polyallyl ethers of polyhydric alcohols such as tetraallyl pentaerythritol, hexaallyl sucrose, hexallyl inositol, hexallyl sorbitol, hexavinyl sucrose and the like; and others.

The acrylonitrile polymers useful in this invention may be prepared in any convenient manner such as by bulk, solution, emulsion or suspension polymerization techniques, all of which are well known to those skilled in the art. For the sake of convenience, however, it is preferred that the acrylonitrile polymers be prepared in an aqueous medium in the presence of a polymerization initiator. The polymerization reaction may be carried out by adding all of the monomer to the reaction mixture at once or in increments or in a continuous manner during the course of the reaction. A suitable emulsifier, surface active agent or dispersing agent is preferably used during the polymerization procedure in the preparation of the acrylonitrile polymers useful in this invention.

The acrylonitrile polymers embodied herein are resinous polymers usually having molecular weights of from about 10,000 to 1,000,000 or more and preferably above about 100,000.

The molded articles useful in the heat treatment process of the present invention or those prepared from previously heat treated oriented acrylonitrile polymers are prepared by compression molding, injection molding, extrusion or similar techniques. It is preferred that the molded articles be prepared by compression molding at a pressure of at least about 1000 p.s.i.g. and at a temperature of from about 85 to 270° C.

The articles produced by the instant process are useful in the production of thermally stable dishes, cups, trays, tools, handles, knobs, electrical insulators, mounting surfaces, valve packings, as polymeric binders for brake linings and the like.

In the following examples, which will further illustrate our invention, the amounts of the various ingredients are given in parts by weight unless otherwise indicated.

EXAMPLE I (A) An acrylonitrile copolymer was prepared from the following recipe:

| | Parts |
|---|---|
| (a) Water | 400 |
| (b) Emulsifier (GAFAC RE–610[a]) | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

[a] A mixture of $R{-}O{-}(CH_2CH_2O{-})_nPO_3M_2$ and
$[R{-}O{-}(CH_2CH_2O{-})_n]_2PO_2M$
wherein $n$ is a number of from 1 to 40, R is an alkyl or alkaryl group and preferably a nonyl phenyl group and M is hydrogen, ammonia or an alkali metal, which composition is sold by the General Aniline and Film Corp.

Ingredients (a)–(e) were charged into a reactor and the temperature was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter with water and was subsequently dried in an oven. The dried polymer was found by X-ray analysis to have a crystallinity of 33.0%.

(B) A portion of the foregoing polymer was sheared by being subjected to milling on a small differential roll rubber mill having rolls at a temperature of 350–360° F. The powdery polymer formed a coarse sheet on the rubber mill. The sheet was found by X-ray analysis to have the following degrees of crystallinity:

| | Percent |
|---|---|
| Top | 73.3 |
| Side | 56.9 |
| End | 40.2 |

This sheet was broken up into chunks which in turn were reduced to small fluffy particles in a Waring blender which were leaf-like in nature and of about 1/8″ diameter on the average. Seven grams of the foregoing sheared, fluffy polymer B. were placed in a metal mold cavity having the dimensions 5″ x 1/2″. A plunger was inserted into the mold cavity onto the polymer and the entire mold assembly was placed in a press provided with a heating element. A pressure of 7,200 p.s.i. was placed on the polymer in the press and heating of the mold was commenced. After about 40 minutes a mold temperature of 160° C. was reached. Heating was stopped and the mold was then cooled to near room temperature. The molded bar of polymer was removed from the mold and it was found to be clear and transparent. The bar was found by ASTM tests to have a flexural strength of $12.3 \times 10^{-3}$ p.s.i., a flexural modulus of $8.6 \times 10^{-5}$ p.s.i., a tensile strength of $8.87 \times 10^{-3}$ p.s.i., and an Izod notched impact strength of 1.07 foot pounds per inch of notch.

Several test bars of the foregoing sheared, fluffy polymer B. were prepared as described above. These test bars were heated in an oven at temperatures of 140, 170, 200 and 235° C. for varying lengths of time. Very little change was noted in 120 hours at 140° C. for flexural strength, flexural modulus, tensile strength or impact resistance of the bar. The hardness, however, had increased from an initial 106 Rockwell M to from 112–117 Rockwell M, and the heat distortion temperature (HDT) went from an initial 93° C. to 173° C.

Table I shows the change in physical properties of the test bars prepared as described above with time under the 170° C. heating conditions:

TABLE I

| Time, hours at 170° C. | HDT, °C. | Flexural strength $\times 10^{-3}$ p.s.i. | Flexural modulus $\times 10^{-5}$ 0.s.i. | Tensile strength $\times 10^{-3}$ p.s.i. | Rockwell M hardness |
|---|---|---|---|---|---|
| 0 | 93 | 11.4 | 7.6 | 5.5 | 106 |
| 9 | 178 | 11.2 | 6.8 | 6.0 | 108 |
| 30 | | 12.0 | 7.4 | 4.4 | 118 |
| 42 | >160 | 8.2 | 6.6 | 5.1 | 125 |
| 137 | >180 | 8.9 | 7.4 | 3.6 | 127 |

The control bar (0 hours) in Table I was found to be soluble in dimethyl formamide and the heat treated bars were all insoluble in this solvent.

The heat treated test bars were all deep brown in color and had a higher specific gravity (1.24) than the non-heat treated test bar (1.18). A test bar which has been heat treated at 170° C. for 96 hours was found in the flame test to be self-extinguishing whereas the non-heat treated control test bar supported a flame and burned readily in the flame test.

Table II gives physical properties for test bars of polymer B. prepared as above which were heat treated at 200° C. in air for various lengths of time.

TABLE II

| Time, hours | HDT, °C. | Flexural strength $\times 10^{-3}$ p.s.i. | Flexural modulus $\times 10^{-5}$ p.s.i. | Tensile strength $\times 10^{-3}$ p.s.i. | Rockwell M hardness |
|---|---|---|---|---|---|
| 0 | 93 | 11.4 | 7.6 | 5.5 | 106 |
| 5 | >200 | 6.5 | 2.0 | 4.0 | 112–114 |
| 24 | >200 | 4.5 | 2.0 | 1.5 | 90–106 |

A test bar heated in the absence of air at 200° C. for 5 hours had the following physical properties:

| | |
|---|---|
| HDT (° C.) | >200 |
| Flex. strength $\times 10^{-3}$ p.s.i. | 8.0 |
| Flex. modulus $\times 10^{-5}$ p.s.i. | 7.9 |
| Tensile strength $\times 10^{-3}$ p.s.i. | 2.5 |
| Rockwell M Hardness | 112–114 |

X-ray diffraction analysis also distinguishes the treated polyacrylonitrile of the present invention from the polyacrylonitrile which has not been heat treated. The heat treated polyacrylonitrile does not show the sharp peaks at 5.3 and 3.0 A. which are characteristic of sheared polyacrylonitrile. X-ray analysis of the heat treated polyacrylonitrile shows only a very broad, low intensity peak near 16° (5.3 A.). The infrared spectrum of the heat treated polyacrylonitrile of this invention does not have the characteristic infrared absorption of polyacrylonitrile at 10.75 cm.$^{-1}$.

Several test bars were prepared as described above from polymer B. of this example, and the test bars were heat treated at 235° C. in an air oven. This treatment produced black bars having a porous surface and poor physical properties.

EXAMPLE II (A) Polyacrylonitrile was prepared in an aqueous suspension by employing the following recipe:

| | Parts |
|---|---|
| Acrylonitrile | 100 |
| Water | 200 |
| Azobisisobutyronitrile | 0.5 |
| t-Dodecyl mercaptan | 1.2 |
| Polyvinyl pyrrolidone | 0.25 |

The polymerization was carried out for six hours with continuous stirring at 60° C. in a nitrogen atmosphere. The resulting slurry was separated by centrifugation, washed throughly with water and dried at 70° C. at reduced pressure.

(B) As in Example I (B), some of the dried polymer from (A) of this example was sheared on a rubber mill.

As in Example I, molded bars were prepared from polymer (B) of this example. The procedure used in preparing the molded bars was similar to that of Example I except that the final mold temperature was about 185° C. in the instant case. The molded bars from sheared polymer (B) had the following physical properties:

| Polymer | Flexural strength $\times 10^{-3}$ p.s.i. | Tensile strength $\times 10^{-3}$ p.s.i. | Izod impact ft. lb./in. |
|---|---|---|---|
| A | 5.7 | 2.68 | 0.24 |
| B | 7.4 | 3.56 | 1.99 |

Results similar to those described in Example I were obtained when the molded test bars of this polymer (B) were heat treated.

EXAMPLE III

A bulk polyacrylonitrile was prepared as follows: 1150 mls. (926 g. or 100 parts by weight) of acrylonitrile, 13.8 g. (1.49 parts by weight) of t-dodecyl mercaptan and 2.0 g. (0.216 part by weight) of azobisisobutyronitrile were stirred under nitrogen in a reactor which was connected to a filter via a pump in such a way that the precipitated polymer was removed as it formed in the monomer. The reactor was heated in a water bath at 60° C. A total of 52 g. of polyacrylonitrile was prepared in 24 minutes. The polymer was a fine white polymer when dried.

A repeat of step (B) of Example I with the foregoing polymer gave results similar to those described in Example I.

EXAMPLE IV

A polymer was prepared using the procedure of Example II from the following recipe:

|  | Parts |
|---|---|
| Acrylonitrile | 100 |
| Water | 200 |
| t-Butyl pivalate | 0.1 |
| t-Dodecyl mercaptan | 0.8 |
| Ethyl acrylate | 5.0 |
| Polyvinyl pyrrolidone | 0.5 |

The resulting polymer was treated as in Example III with similar results.

EXAMPLE V

The fluffy, sheared acrylonitrile polymer of Example I (B) was heat treated for about 96 hours at 170° C. in an air oven. The polymer underwent a weight increase of 0.115%. The resulting brown material was compression molded into a 5" x ½" bar at 210° C. and 9200 p.s.i. for 35 minutes. The resulting smooth, dark brown bar had the following physical properties:

| HDT, ° C. | >200 |
|---|---|
| Flexural strength×$10^{-3}$ p.s.i. | 5.7 |
| Flexural modulus×$10^{-5}$ p.s.i. | 7.2 |
| Tensile strength×$10^{-3}$ p.s.i. | 3 |
| Rockwell M Hardness | 106 |
| Specific gravity | 1.31 |
| Flammability | Self-extinguishing |

EXAMPLE VI

A test bar was prepared as in Example I (B), and this bar was heat treated at 140° C. in an air oven for a period of two hours. The original bar had a heat distortion temperature of 93° C., and the heat treated bar had a heat distortion temperature of 97° C.

We claim:

1. The process for improving the softening temperature and flame-resistance of an article prepared by molding a sheared resinous non-thermoplastic acrylonitrile polymer at a temperature in the range of from about 85° C. to 270° C. and a pressure of at least 1000 p.s.i., said acrylonitrile polymer being selected from the group consisting of an acrylonitrile homopolymer and copolymer prepared from a monomer mixture of at least 90 percent by weight of acrylonitrile and up to 10 percent by weight of at least one other monomer copolymerizable with acrylonitrile, the improvement being brought about by heat-treating said polymer at a temperature of from 130° C. to 250° C. either before or after the molding step.

2. The product produced by the process of claim 1 being characterized as having a broad X-ray diffraction band at 5.3 A., an ASTM heat distortion temperature of more than 100° C., a specific gravity above 1.18, a hydrogen analysis between 1.96 percent and 5.70 percent and no 10.75 cm.$^{-1}$ infrared band.

3. The product of claim 2 wherein the acrylonitrile polymer is polyacrylonitrile.

4. The process of claim 1 wherein the heat-treating step is carried out prior to the molding step.

5. The process of claim 1 wherein the heat-treating step is carried out subsequent to the molding step.

References Cited

UNITED STATES PATENTS

| 2,531,196 | 11/1950 | Brubaker et al. | |
|---|---|---|---|
| 2,560,680 | 7/1951 | Allewelt. | |
| 2,606,176 | 8/1952 | Dunn. | |
| 2,692,875 | 10/1954 | Weinstock et al. | |
| 2,710,846 | 6/1955 | Dietrich et al. | 260—29.6 |
| 3,069,402 | 12/1962 | Smart. | |
| 3,098,060 | 7/1963 | Miller | 260—88.7 |
| 3,132,122 | 5/1964 | Dunay et al. | 260—88.7 |
| 3,313,790 | 4/1967 | Baer | 260—88.7 |
| 3,412,177 | 11/1968 | Griffith | 260—881 |

HARRY WONG, JR., Primary Examiner

U.S. Cl. X.R.

260—85.5, 78.5; 264—140, 235, 118